US008627256B2

(12) United States Patent
Hawk

(10) Patent No.: US 8,627,256 B2
(45) Date of Patent: Jan. 7, 2014

(54) METHOD FOR COMPUTING IO REDISTRIBUTION ROUTING

(75) Inventor: Donald E. Hawk, King of Prussia, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/093,472

(22) Filed: Apr. 25, 2011

(65) Prior Publication Data

US 2012/0272203 A1 Oct. 25, 2012

(51) Int. Cl.
*G06F 17/50* (2006.01)

(52) U.S. Cl.
USPC .......................................................... 716/126

(58) Field of Classification Search
USPC ................................................. 716/100, 126
See application file for complete search history.

(56) References Cited

U.S. PATENT DOCUMENTS

| 6,057,169 | A  | * | 5/2000  | Singh et al. ..................... 438/14 |
| 6,457,157 | B1 | * | 9/2002  | Singh et al. ................... 716/122 |
| 6,593,300 | B1 | * | 7/2003  | Bajusz et al. ................. 514/20.2 |
| 6,674,166 | B2 |   | 1/2004  | Rao et al. |
| 8,456,025 | B2 | * | 6/2013  | Yokoyama ..................... 257/786 |
| 2001/0039644 | A1 | * | 11/2001 | Le Coz ........................... 716/11 |
| 2011/0309515 | A1 | * | 12/2011 | Yokoyama ..................... 257/773 |

OTHER PUBLICATIONS

Fang, Jia-Wei, et al.; "A Routing Algorithm for Flip-Chip Design", 2005 IEEE, pp. 752-757.

* cited by examiner

*Primary Examiner* — Suchin Parihar

(57) ABSTRACT

A method of determining signal routing in an integrated circuit includes providing first coordinates of an input/output cell and second coordinates of an input/output pad to a parametric routing module. The parametric routing module receives at least one wire path parameter. The parametric routing module uses the at least one connection path parameter to determine a physical dimension of a wire path between the first coordinates and the second coordinates.

26 Claims, 8 Drawing Sheets

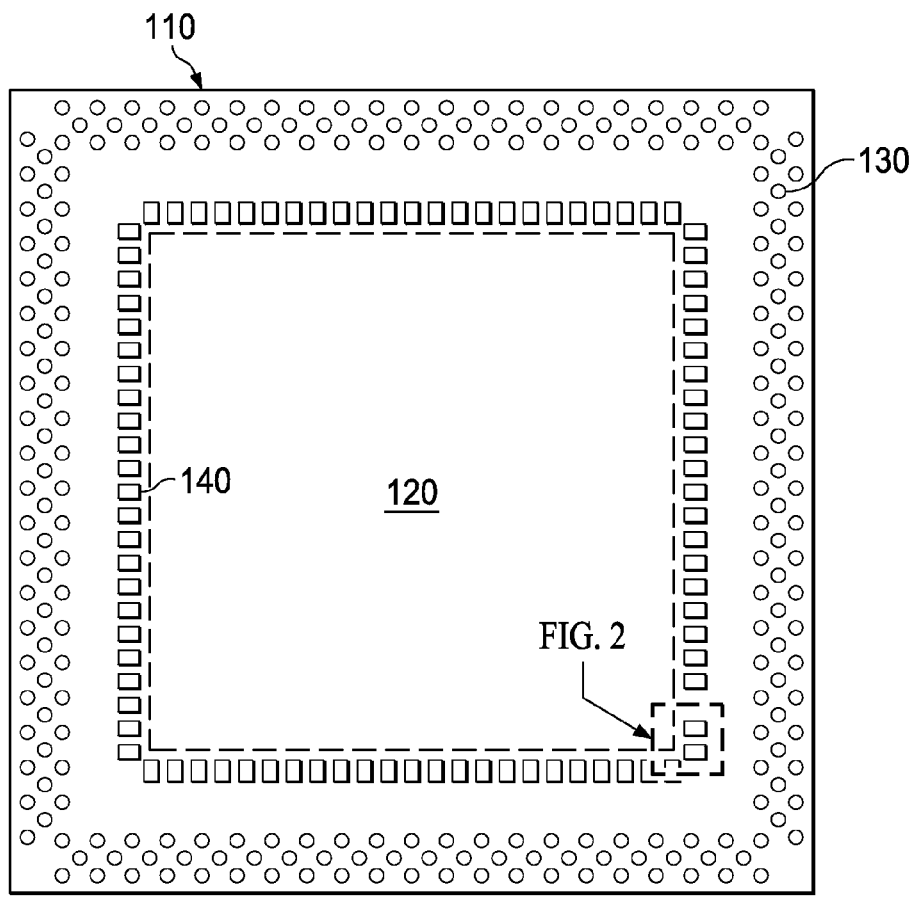
FIG. 1
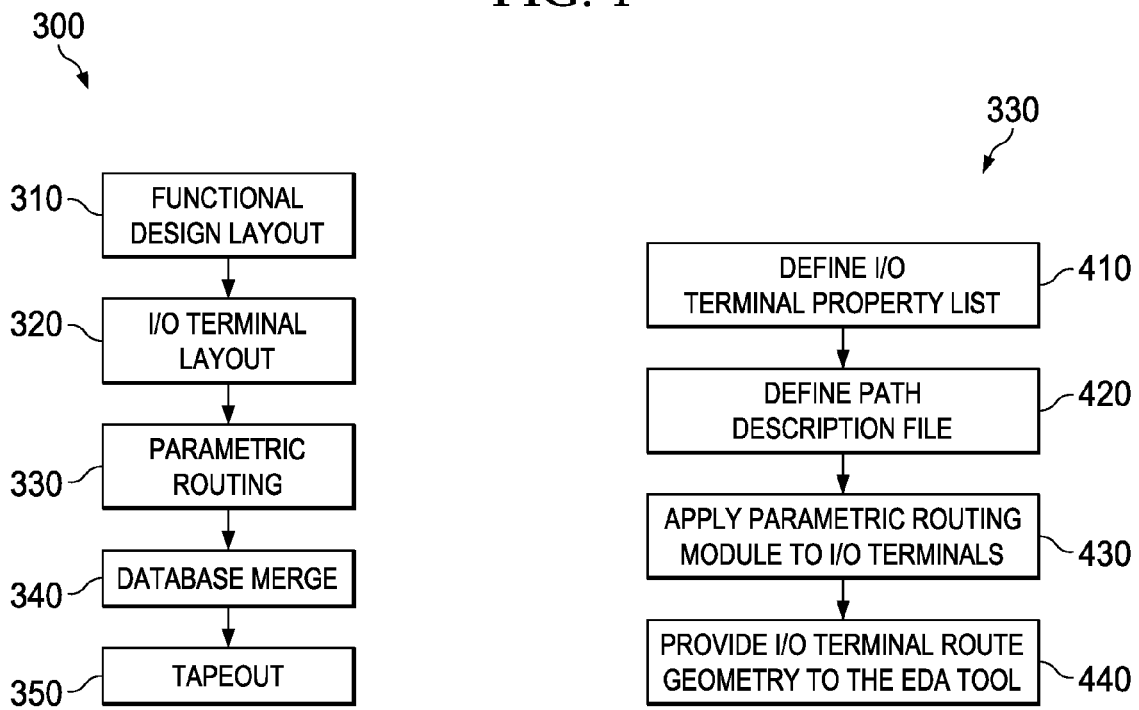
FIG. 3
FIG. 4

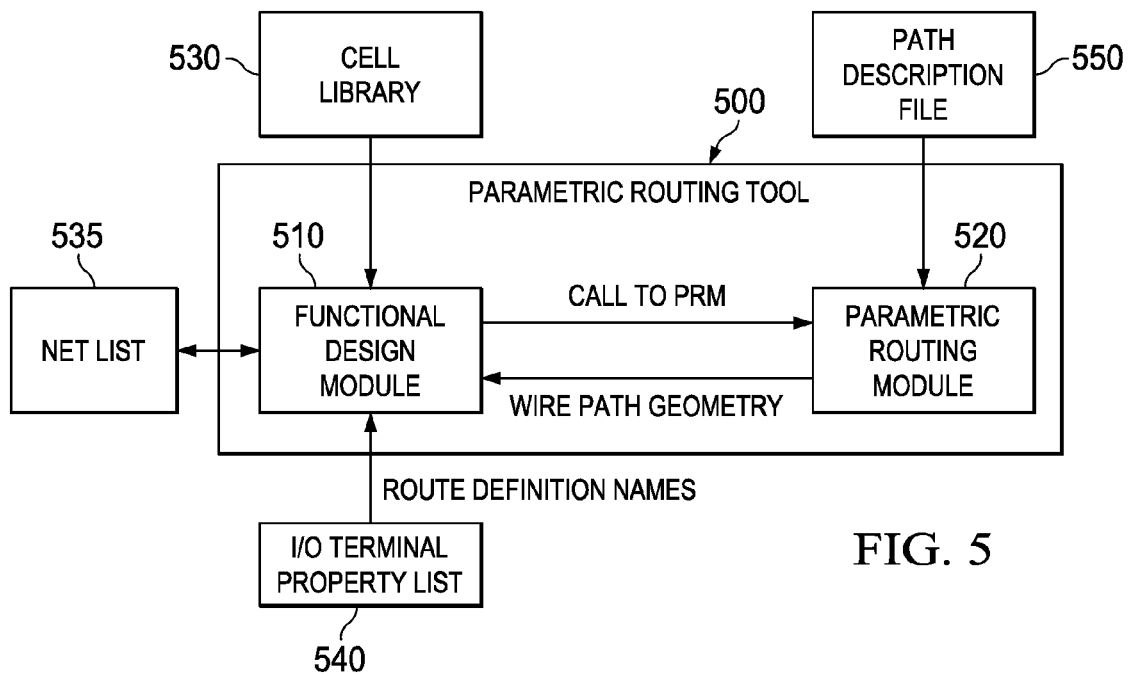
FIG. 5
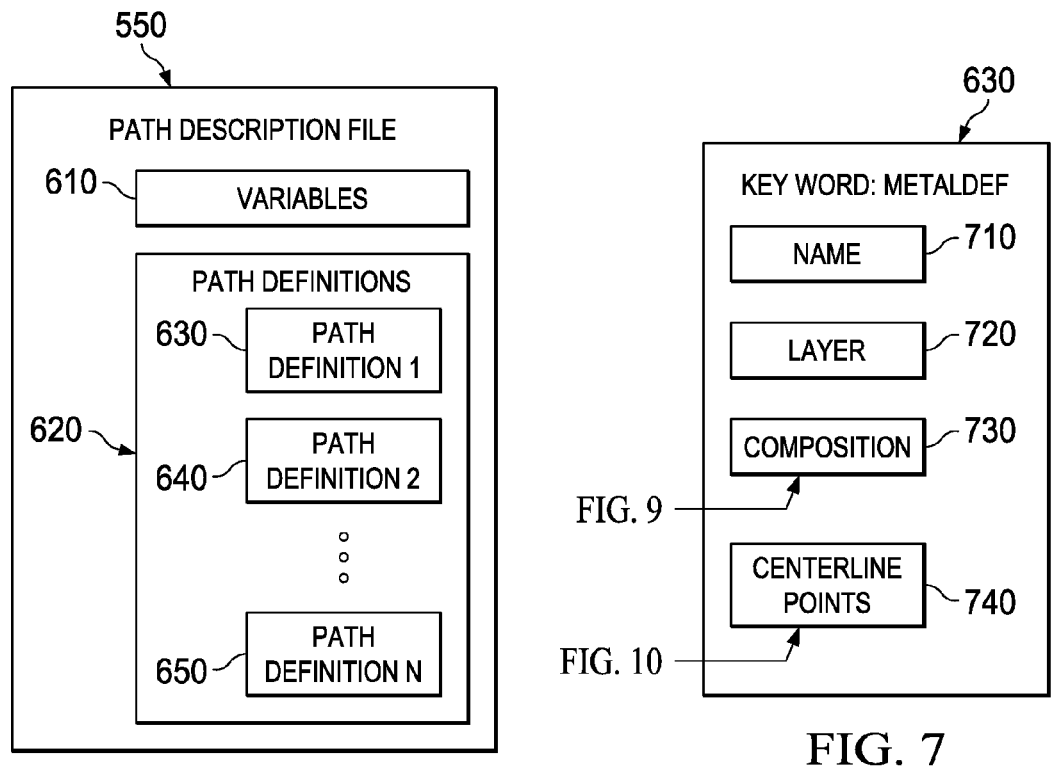
FIG. 6
FIG. 7

METHOD FOR COMPUTING IO REDISTRIBUTION ROUTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO A COMPUTER PROGRAM

A computer program listing appendix is filed herewith submitted on a single compact disc and a copy of the compact disk. The compact disk, and its duplicate copy, includes a single Adobe Acrobat file entitled "Appendix A.txt", created on Mar. 9, 2011, which is about 27,179 bytes in, size. The file and the duplicate copy are identical. The file includes portions of illustrative computer code implementing one embodiment of the disclosure. The contents of this file are incorporated herein by reference. The contents of Appendix A are protected by copyright, subject to the copyright notice above, ©LSI Corporation, unpublished work.

TECHNICAL FIELD

This application is directed, in general, to systems and methods for electronic design automation.

BACKGROUND

An integrated circuit (IC) typically includes numerous connections between electrical components. These connections are often designed with the assistance of an electronic design automation (EDA) tool. The EDA tool typically includes software instructions operating on an engineering workstation to provide visualization of the IC design. A design engineer manipulates modular design cells from a cell library to build up a design database. An autorouter within the EDA tool determines the connection paths between the design cells. When the design layout is complete, the layout data are used in a pattern generation (PG) step that generates pattern data suitable to produce a set of pattern masks used in photolithographic steps of an IC manufacturing process.

Among the connections made on the IC are input/output redistribution connections formed between IO cells and corresponding wirebond pads and/or bump pads, collectively referred to as IO pads. The redistribution connections are typically formed in a redistribution layer. Signal routing within the redistribution layer is often constrained by factors including the congestion of the connection and the mapping of IO signals to the IO pads. In many cases these constraints cause the routing of the IO connections to be deficient in some way, such as being is undesirably circuitous. In some cases the autorouter may even fail to find a path between an IO cell and its corresponding IO pad.

Such cases may require manual intervention by a design engineer, consuming valuable engineering resources and increasing the design cost. Improved methods of forming connections within the redistribution layer are needed to reduce these costs.

SUMMARY

One aspect provides a method of determining interconnect routing in an integrated circuit. The method includes providing first coordinates of an input/output cell and second coordinates of an input/output pad to a parametric routing module. The parametric routing module receives at least one wire path parameter. The parametric routing module uses the at least one path parameter to determine a physical dimension of an interconnect between the first coordinates and the second coordinates.

Another aspect provides an integrated circuit input/output signal routing system. The signal routing system includes a functional design module and a parametric routing module. The parametric routing module is configured to receive from the functional design module first coordinates of an input/output cell, second coordinates of an input/output pad, and at least one wire path parameter. The parametric routing module is further configured to use the at least one path parameter to determine a physical dimension of an interconnect between the input/output cell and the input/output pad.

Another aspect provides a computer program product. The computer program product includes a non-transitory computer readable medium having a series of operating instructions embodied therein. The series of operating instructions is adapted to be executed to implement a method of determining signal routing in an integrated circuit. The method includes providing first coordinates of an input/output cell and second coordinates of an input/output pad to a parametric routing module. At least one wire path parameter is provided to the parametric routing module. The parametric routing module uses the at least one path parameter to determine a physical dimension of an interconnect between the first coordinates and the second coordinates.

Yet another aspect provides a computer program product. The computer program product includes a non-transitory computer readable medium having a series of operating instructions embodied therein. The series of operating instructions is adapted to be executed to implement a method of determining signal routing in an integrated circuit. The method includes receiving first coordinates of an input/output cell and second coordinates of an input/output pad into a parametric routing module. The parametric routing module receives at least one wire path parameter. The at least one path parameter is used to determine a physical dimension of an interconnect between the first coordinates and the second coordinates.

BRIEF DESCRIPTION

Reference is now made to the following descriptions taken in conjunction with the accompanying drawings, in which:

FIG. 1 illustrates an integrated circuit including IO cells and IO pads;

FIG. 3 illustrates steps of a method of the disclosure, including a parametric routing step, for determining a wire path between an IO cell and an IO pad using a wire path parameter that describes an aspect of the physical layout of the wire path;

FIG. 4 illustrates expands on the parametric routing step of FIG. 3;

FIG. 5 illustrates a parametric routing tool in one embodiment according the principles of the present disclosure;

FIG. 6 illustrates aspects of a path description file that includes path definitions that describe wire paths that may be specified for connecting one or more IO pads to an IO cell of the IC of FIG. 1;

Figure 10A:
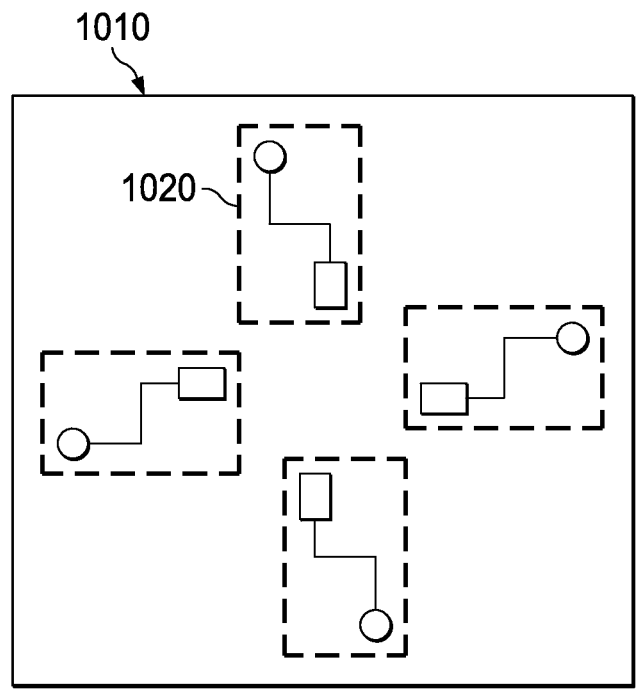
Figure 10B:
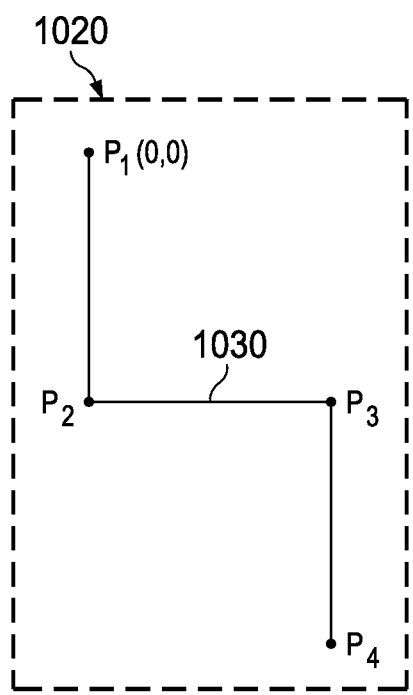
Figure 11A:
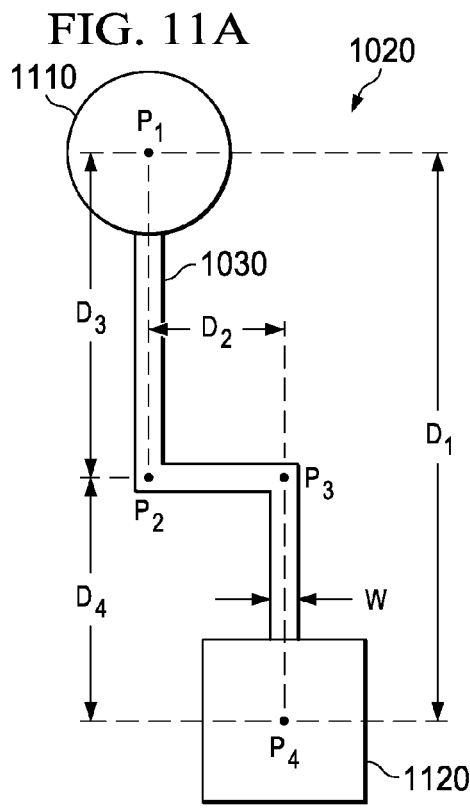
Figure 11B:
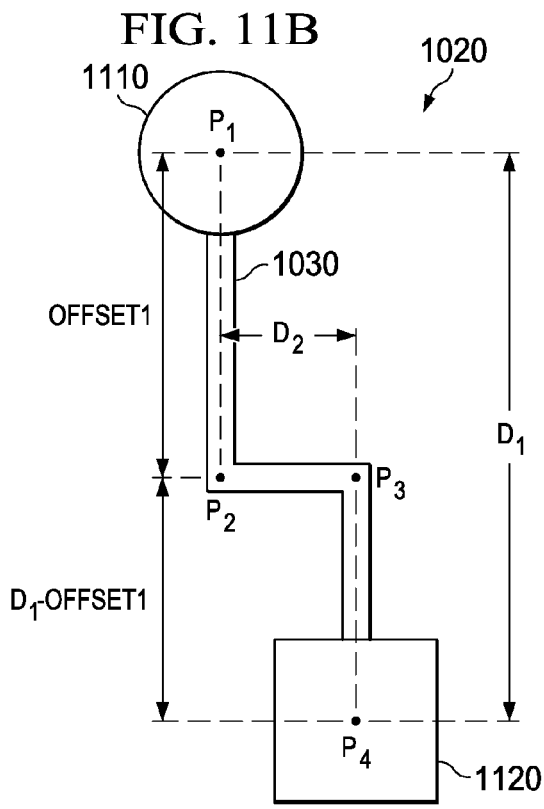
Figure 12:
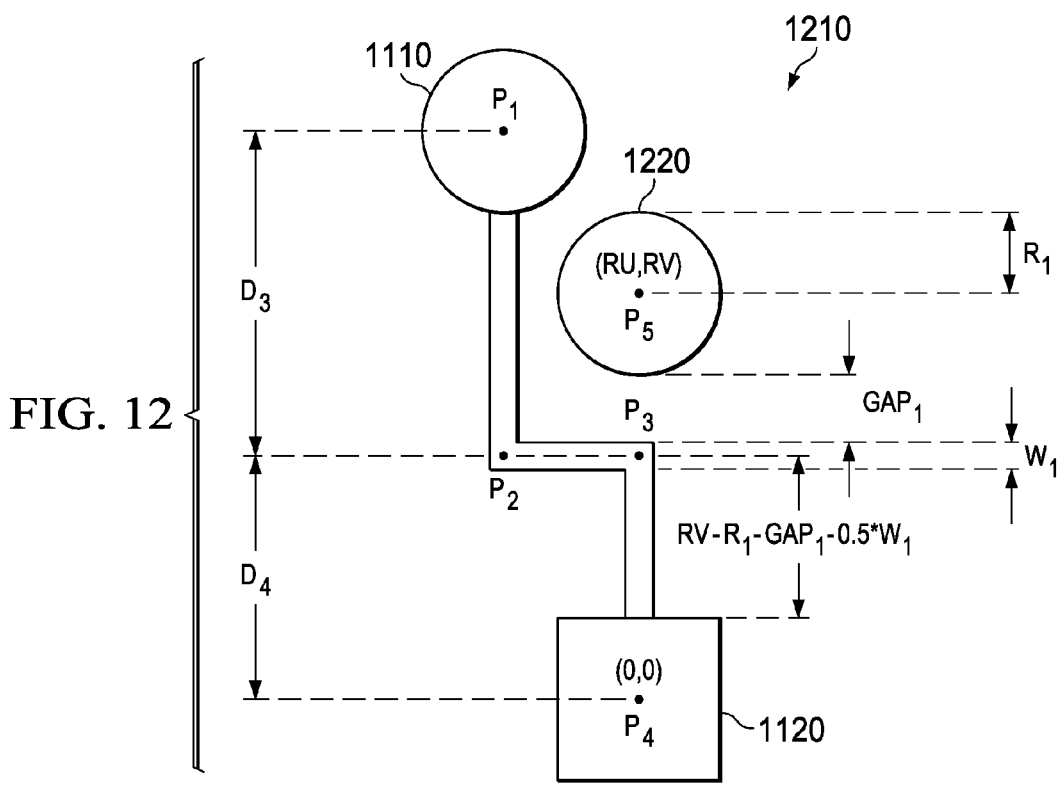
Figure 13A:
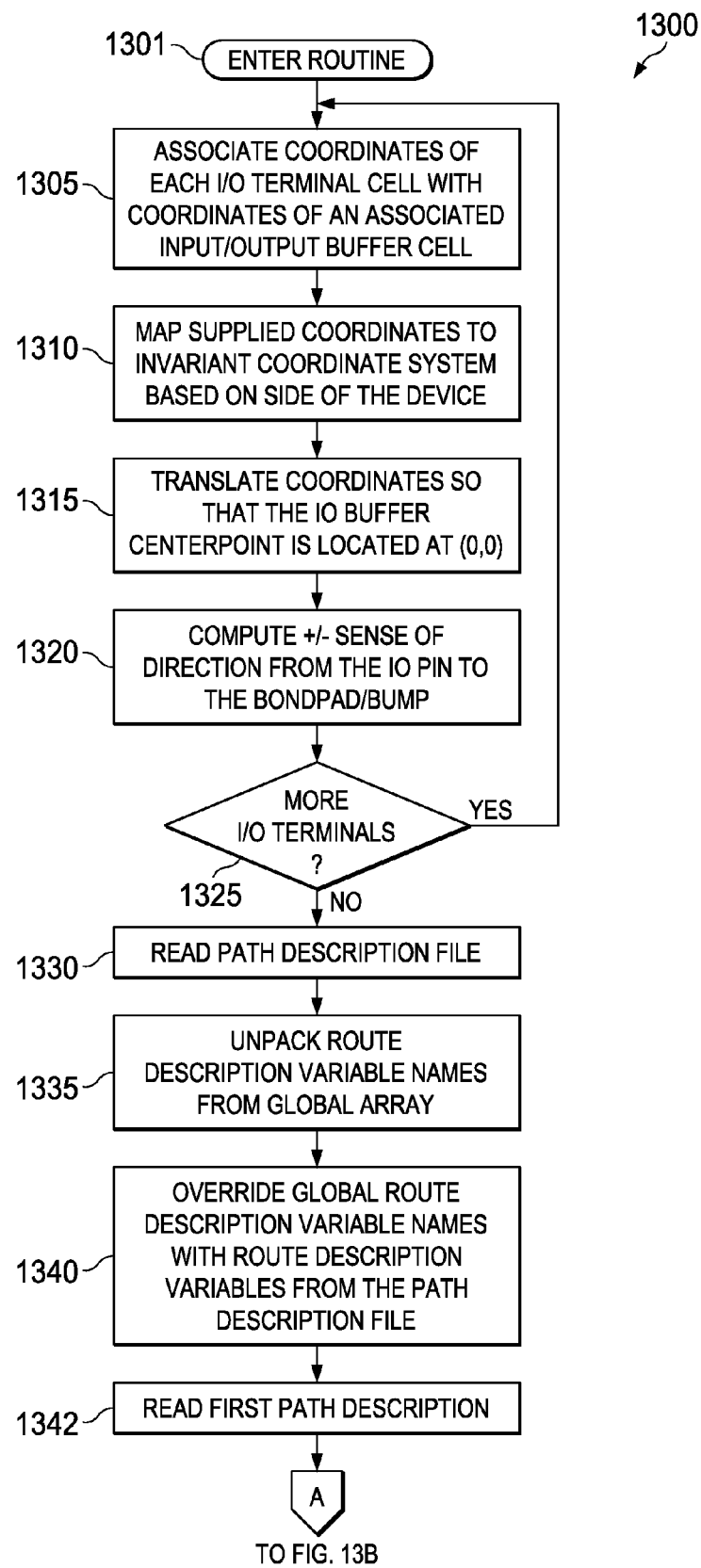
Figure 13B:
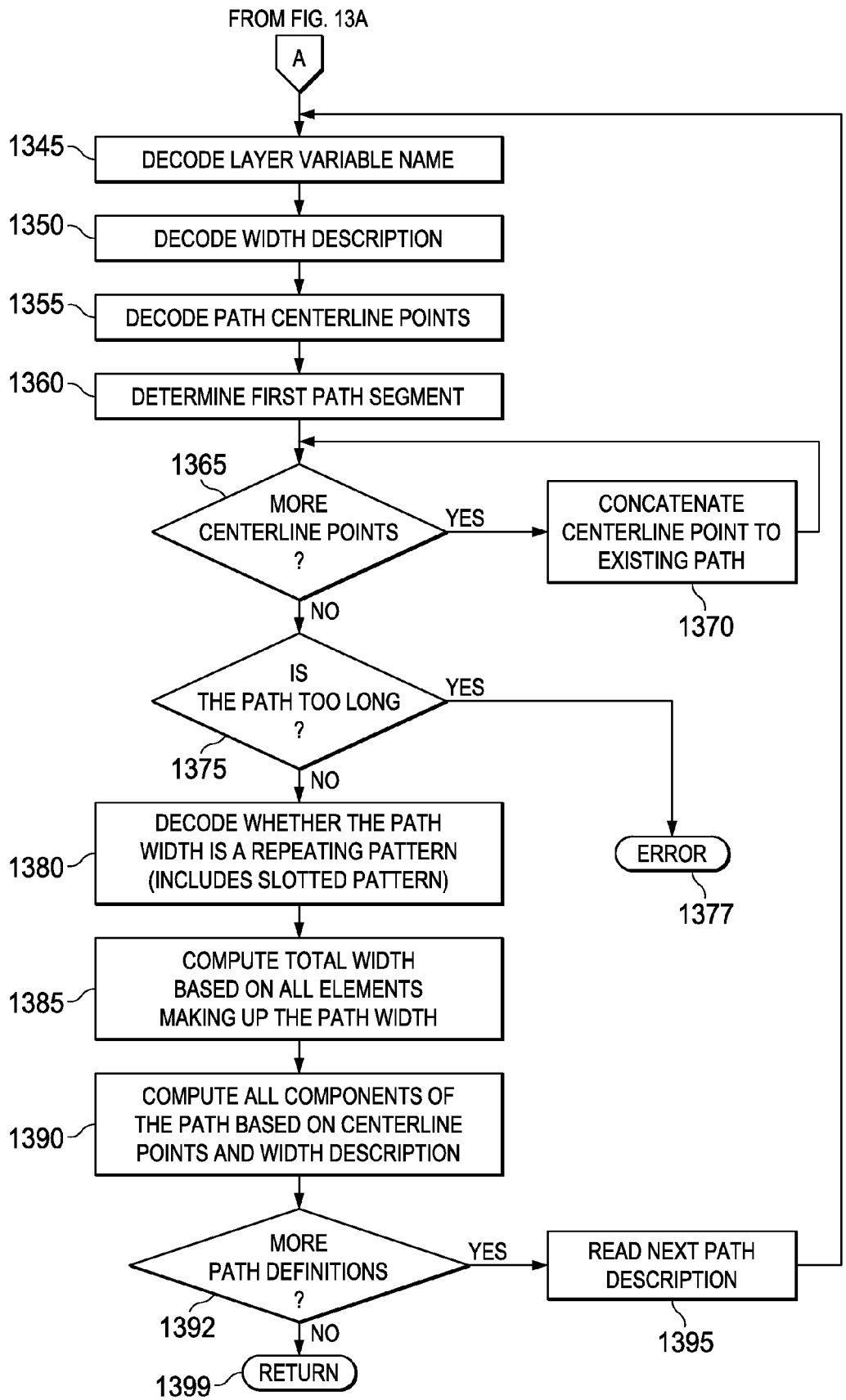

FIGS. 7, 8A, 8B, and 9 illustrate aspects of the path definitions of FIG. 6;

FIGS. 10A and 10B illustrate instances of an IO region that includes an IO pad and an IO cell, wherein a wire path is determined by the parametric routing tool of FIG. 5;

FIGS. 11A, 11B and 12 illustrates aspects of parametric routing between an IO pad and an IO cell by the parametric routing tool of FIG. 5; and FIGS. 13A and 13B illustrate a method of the disclosure for determining a wire path between an IO pad and an IO cell using a parameter that determines a routing feature of the wire path.

DETAILED DESCRIPTION

Embodiments of methods and systems described herein provide an innovative technique to determine the redistribution routing that substantially reduces manual intervention. Embodiments described herein provide methods and systems for computing a redistribution route based upon layout-specific and/or technology-specific parameters. Complex routes from IO cells to IO pads can be sequentially developed by adding additional routing to previously defined route descriptions through an inheritance mechanism. Moreover, the route of a desired IO path may be adjusted by overriding globally defined variables with locally defined variables.

In various embodiments a user selects from a library of route types and assigns the route type as a property to a particular IO cell and/or pad in the design. These route types may refer to a description of the routes in a text file format that includes a layer, a width, a net name and at least two points. The route may include parameter values based upon the actual layout or user defined values. A physical path is created based on the route description to be included in the layout.

FIG. 1 presents an IC 110 formed using one or more embodiments of the disclosure. The IC 110 includes functional circuitry 120 and IO pads 130. The functional circuitry 120 may include, e.g. gates, transistors, and memory associated with desired functions provided by the IC 110. Various IO signals may be provided by or to the functional circuitry 120 via IO cells 140. The IO cells 140 may include ESD protection circuitry and/or other circuitry that provides an interface between the functional circuitry 120 and other devices or power sources to which the IC 110 may be connected. The IO pads 130 may be any structure suitable for electrically connecting the IC 110 to other devices, e.g. bump pads or wire bond pads.

The IC 110 may be represented as a database of geometrical elements and associated route designators. For example, all the geometrical elements of an interconnect (also referred to herein as a wire) between two electrical components of the IC 110 may be logically associated by a route name to support design and error checking of the IC 110 design.

Figure 2A:
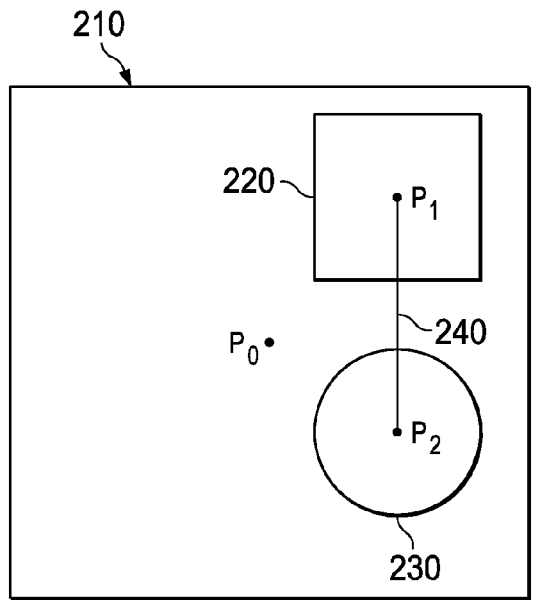
FIGS. 2A-2C illustrate examples of wire paths between an IO cell and an IO pad.

FIG. 2A presents an illustrative IO region 210 that includes an IO cell 220 and an IO pad 230. The IO region 210 and the IO cell 220 may share a common designator that logically associates these elements with a signal path between them. A wire path 240 connects the IO region 210 and the IO cell 220. The IO region 210 may be viewed as a local frame of reference within which geometrical relationships between the IO cell 220, the IO pad 230 and the wire path 240 may be expressed mathematically. The wire path 240 may be viewed as a centerline of an interconnect (wire), the geometrical aspects of which are to be determined.

Points $P_0$, $P_1$ and $P_2$ are respectively associated with the IO region 210, the IO cell 220, and the IO pad 230, e.g. at the geometrical centers thereof. $P_0$ may be regarded as the origin of the local frame of reference of the IO region 210. The wire path 240 is a single segment between $P_1$ and $P_2$.

Figure 2B:
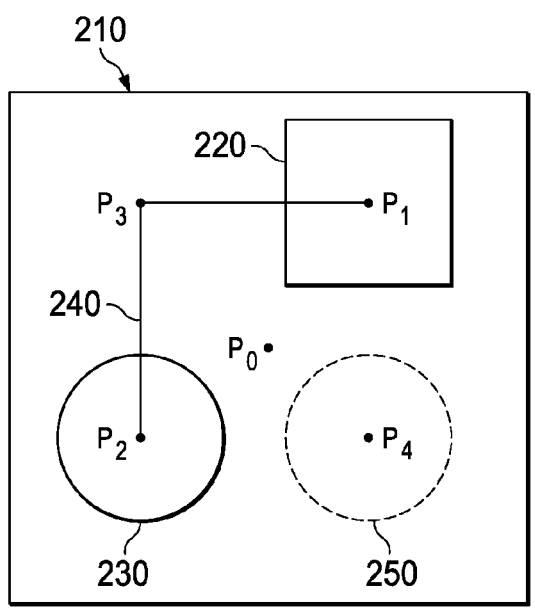

FIG. 2B illustrates the IO region 210 including a reference object 250, e.g. another IO pad. The reference object 250 has an associated center point $P_4$. The reference object 250 may obstruct the wire path 240 in some way. For instance, in this example the IO cell 220 and the IO pad 230 are not vertically aligned so the wire path 240 includes two segments, one between $P_1$ and $P_3$, and another between $P_2$ and $P_3$. The presence of the reference object 250 constrains the location of $P_3$ to be located above and left of $P_0$. The alternative case, in which $P_3$ would be located below and right of $P_0$, is not possible without the wire path 240 intersecting the reference object 250.

Figure 2C:
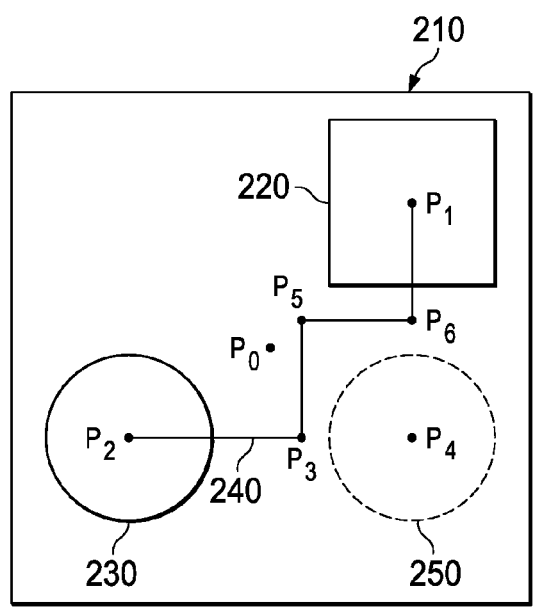

FIG. 2C illustrates another example in which the IO region 210 includes the reference object 250. In this case the wire path 240 includes a segment from $P_2$ to $P_3$ where $P_3$ is located between $P_2$ and $P_4$, and a segment from $P_1$ to $P_6$, where $P_6$ is located between $P_1$ and $P_4$. To avoid intersecting the reference object 250, the wire path 240 includes two additional segments via point $P_5$. The wire path 240 of this example may be desirable, e.g. when layout congestion makes the upper left of the IO region 210 unavailable.

Conventional EDA tools sometimes fail to adequately autoroute a wire path between the IO cell 220 and the IO pad 230. For instance, sometimes a conventional EDA tool fails to provide an efficient wire path when an obstruction such as the reference object 250 is present. Methods and systems of the disclosure provide a designer with the ability to specify one or more wire path templates that may be specifically rendered using one or more wire path parameters, referred to herein briefly as path parameters. The path parameters may be determined by the designer based on desired properties of the rendered interconnect, such as length, width, or resistance. A parametric routing tool 500 described below may render the wire path based on the provided parameters. The resulting interconnects in many cases require less manual review and adjustment prior to generating a mask set for IC fabrication.

FIG. 3 presents an illustrative design sequence 300 in accordance with the disclosure that may be used to form the IC 110. The design sequence 300 includes a functional design layout step 310, an IO pad layout step 320, a parameter routing step 330, a database merge step 340 and a tapeout step 350. The design sequence 300 provides a database of geometrical elements that may be used to manufacture a mask set configured to fabricate the IC 110.

In the functional design layout step 310, the functional circuitry 120 may be rendered in a design database using a functional design module 510 described further below. In the IO pad layout step 320, the locations of the IO pads 130 relative to the global coordinate space of the IC 110 are determined. In this step properties of the wire path 240 between each of the IO cells 140 and one or more of the IO pads 130 may be determined. For example, a template of the wire path 240 may be selected, and parameters appropriate to that template may be specified. Various aspects of the wire path parameters are described in detail below.

In the parameter routing step 330 the locations are determined of physical segments of an interconnect formed along the wire path 240. The wire path 240 and characteristics of the rendered interconnect, such as segment lengths and path width, may be determined by employing the parameters determined in the layout step 320. The wire path 240 is determined by program instructions in a parametric routing module 520, as described further below. The parametric routing step produces a list of geometrical elements that complete the electrical connection between the IO cell 220 and the IO pad 230 in a manner consistent with the supplied parameter(s).

In the database merge step 340 the geometrical elements are merged with the functional circuitry database. The combined database may be used in the tapeout step 350 to fabricate one or more masks of the mask set associated with the IC 100.

FIG. 4 presents an embodiment of the parametric routing step 330 that illustrates various sub-steps that may be used therein. In a step 410 properties of the IO pads may be defined. Such properties may include width, metal layer, presence and width of optional dielectric spaces in wide metal lines, and the length of one or more segments of a wire that includes at least one bend.

In a step 420 a path description file is defined. The path description file may include a description of physical aspects of a wire path in terms of one or more parameters names. The path description file is described in additional detail below.

In a step 430 the parametric routing module 520 is invoked. The parametric routing module 520 may substitute parameter values specified in the IO pad layout step 320 for the one or more parameter names. Thus, for example, a wire path segment width may be defined in terms of a resistance parameter value. The width may be calculated based on the resistance using well-known relationships. A wire path segment may then be determined using the calculated width. This aspect is discussed in further detail below.

In a step 440 the parametric routing module 520 provides the geometrical definition of the wire path 240 to the functional design module 510. The parametric routing step 330 may be repeated for each IO region 210 for which parametric routing is desired.

FIG. 5 illustrates a block diagram of an embodiment of the parametric routing tool 500, an apparatus, constructed according to the principles of the present disclosure. The parametric routing tool 500 is configured to perform parametric routing of an interconnect between an instance of the IO cell 140 and one or more instances of the IO pad 130 as described herein. To perform the described functions, the parametric routing tool 500 may be embodied as a series of operating instructions stored on a computer-readable medium, such as a non-transitory computer-readable medium, that directs the operation of a processor when initiated thereby. Herein and in the claims non-transitory media comprise all computer-readable media except for a transitory, propagating signal. Accordingly, the parametric routing tool 500 may include a processor and an associated memory. In one embodiment, the parametric routing tool 500 may be a dedicated computing device including any necessary circuitry (including a processor and memory) or software to perform the described functions. The parametric routing tool 500 may include a commercially available or a proprietary EDA tool configured to operate the functional design module 510 and the parametric routing module 520. In one embodiment, the parametric routing tool 500 includes the IC Compiler tool from Synopsys, Inc., Mountain View, Calif., USA to provide an I/C layout database and instructions (code) to implement the functional design module 510 and the parametric routing module 520.

The functional design module 510 executes instructions to design the functional circuitry 120. The functional design module 510 receives design cells from a cell library 530 and provides interconnections between the design cells. The functional design module 510 derives cell tags from the cell library 530 that identify the IO cells 220 and the IO pads 230, e.g. using an appropriately configured application programming interface (API). The functional design module 510 receives data from and provides data to a net list 535 that describes the interconnections between the design cells. The description may include, e.g. name tags that uniquely identify each signal net that connects two or more ports of a number of design cells. Among the signals nets are those that include connections between each IO cell 140 and one or more of the IO pads 130. Thus the logical association between the IO cells 140 and the IO pads 130 may be determined.

The functional design module 510 also receives data from an IO pad property list 540. The property list 540 includes parameters that describe aspects of the route taken by each wire path 240. Such parameters may include without limitation the name of the template of the wire path 240, the length and width of one or more segments of the wire path 240, the spacing of one or more segments from a routing obstruction, or a resistance of the wire path 240. The property list 540 may be created by a design engineer using any appropriate template or text editor, e.g. Microsoft Excel™.

The functional design module 510 invokes the parametric routing module 520, e.g. by another API call. The API call includes identification of a path description file 550 such as by file name or pointer. The path description file 550 may include one or more variables defined for local use by the parametric routing module 520. The path description file 550 includes a number of metal definitions or "metalDef" lines that specify the characteristics of a named template for the wire path 240. The parametric routing module 520 uses the parameters provided by the property list 540 to determine the specific characteristics of the wire path template using the metalDef lines of the path description file 550. The parametric routing module 520 then returns the geometric elements of the wire paths 240 to the functional design module 510 to be integrated with the database of geometrical elements that describe the functional circuitry 120.

The above-described apparatuses and methods may be embodied in or performed by various digital data processors or computers, wherein the computers are programmed or store executable programs of sequences of software instructions to perform one or more of the steps of the methods e.g., steps of the methods or processes of FIGS. 3, 4, and/or 5. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods. Accordingly, computer storage products with a computer-readable medium that have program code thereon for performing various computer-implemented operations that embody the tools or carry out the steps of the methods set forth herein may be employed. The media and program code may be specially designed and constructed for the purposes of the disclosure, or they may be of the kind well known and available to those having skill in the computer software arts. An apparatus, such as an EDA tool, may be designed to include the necessary circuitry or series of operating instructions to perform each step of the disclosed methods.

Turning to FIG. 6, illustrated is a block diagram of one embodiment of the path description file 550 that may be used in various embodiments to specify characteristics of the wire path 240. In the illustrated embodiment the path description file 550 includes a variable definition block 610 and a path definition block 620.

Table 1 below illustrates one embodiment of a variable definition block 610. This embodiment includes nine variable definitions. Each variable definition begins with a keyword, e.g. "wireVal", that may signal a parsing routine of the parametric routing module 520 that the contents of the line following the keyword describes a variable definition. A variable may be equated with a direct value. For example, a first variable definition line defines a variable pitch as equal to 180.0, e.g. 180 µm. A variable may also be defined indirectly, e.g. in terms of another variable. For example, a second variable definition line defines a variable hpitch as one half the value of pitch. In some cases a variable specifies a value of a metal level in an IC design, e.g. topLayer is a metal level 74. A variable gWidth may define a maximum width of the wire path 240 before a gap is added to the wire path 250, e.g. to reduce dishing from chemical-mechanical polishing. A variable gGap may define a width of the gap, when present. The examples of variables provided by Table 1 are not exhaustive. Those skilled in the pertinent art will appreciate that other variables may be useful in determining the characteristics of the wire path 240.

TABLE 1

| wireVal pitch | 180.0 |
|---|---|
| wireVal hpitch | $pitch/2 |
| wireVal bSize | 102.1 |
| wireVal hbSize | 0.5 * $bSize |
| wireVal topLayer | 74 |
| wireVal subLayer | 37 |
| wireVal nxtLayer | 36 |
| wireVal gWidth | 18.0 |
| wireVal gGap | 8.0 |

The path definition block 620 may include a number of path definitions, illustratively path definitions 630, 640, 650. Table 2 below includes several illustrative path definitions, including examples using a keyword metalDef and an example using a keyword routeLike.

TABLE 2 metalDef WXF $topLayer {{$gwidth **}} {{$x_1$ $y_1$} {$x_2$ $y_2$} ... {$x_n$ $y_n$}}
metalDef WXF $topLayer {{$gwidth **}} {{$x_1$ $y_1$} {* $y_2$} {$x_3$ *}}
routeLike WXE WXF
metalDef WXF $topLayer {{$gWidth *} {$gGap gap} \
  {$gWidth *}} {{-$gOffsetb 0.0} {-1.0*$pitch+0.5*$gWidth 0.0}}

FIG. 7 illustrates schematically the general syntax of one embodiment of a metalDef-type path definition line, e.g. the path definition 630. The path definition 630 includes a template name field 710, a layer field 720, a composition field 730 and a centerline points field 740. The layer, composition and centerline points fields 720, 730 740 may include references to variables previously defined, such as those of Table 1.

The template name field 710 may include any convenient name for associating a particular wire path template with an IO pad designated to use that template. For example, in the first line of Table 2 the template name is "WXF". The layer field 720 specifies the layer of the defined segment of the wire is $topLayer, e.g. 74 as specified in Table 1. This layer number corresponds to a particular layer of the design database of the IC 100. For example, layer 74 may designate a top-level metal layer. The layer can be given in a conditional form, e.g. $hLayer:$vLayer, wherein the layer number is dependent on whether the segment of the path is horizontal or vertical.

Figure 8A:
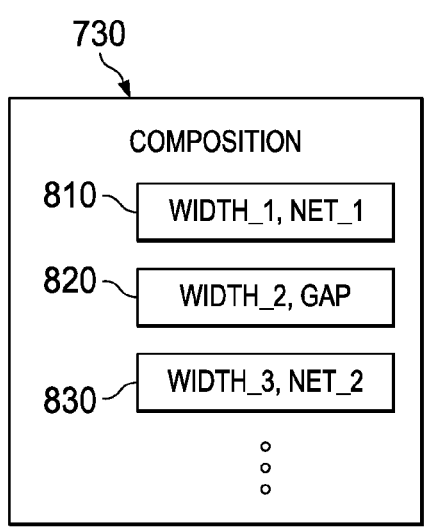

FIG. 8A illustrates the syntax of the composition field 730. The composition field 730 includes at least one subfield, such as a subfield 810, and may optionally include one or more additional subfields 820, 830. In one example, a simple segment that does not include any slots may include only the subfield 810. In a more elaborate example multiple subfields may describe two or more metal paths electrically in parallel for the defined segment, with each path separated by a gap.

The subfield 810 includes a width, e.g. $gwidth in Table 2. Referring to Table 1, $gwidth is specified as 18.0 µm. Following the width is a net name, e.g. net_1. In various cases, the net name may be the input/output of the IO cells port, or may be a power or ground supply name. An optional flag may replace the net name for special purposes or overriding default operation of the parametric routing module 520.

For example, in Table 2 "*" or "**" may follow the composition field value. These flags may direct the parametric routing module 520 to perform certain actions related to routing the wire path 240. In one example, a "*" flag may direct the parametric routing module 520 to assign the signal name associated with the IO pad 230 to the net name of the wire path 240 segments defined by the metalDef line.

In another example, a "**" flag may direct the parametric routing module 520 to assign the signal name of the path to the net name, and may additionally prevent subsequent operations from occurring on the path. For instance this flag may be used to prevent the parametric routing module 520 from tapping into the wire path 240, e.g. for power or ground, when doing so would cause layout congestion, or when a power or ground wire path is intended for shielding.

Figure 8B:
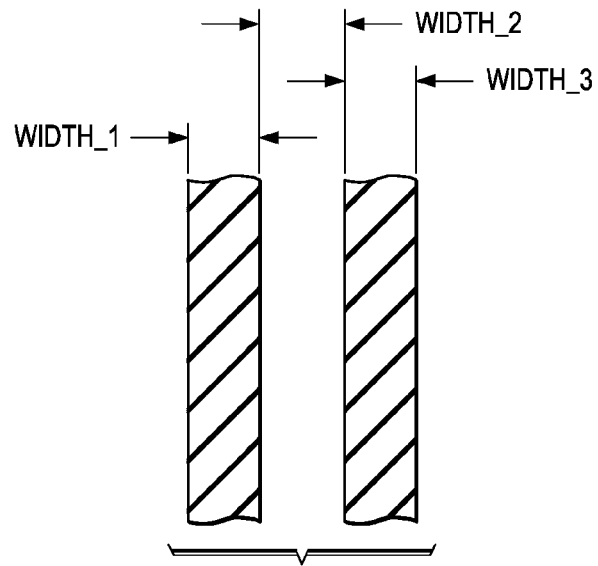

The subfield 820, if present, includes a width value width_2, and a flag "gap" that designates the current portion of the segment is a gap between parallel metal lines. The subfield 830 includes a width value width_3 and a net name net_2. Typically net_2 will be the same as net_1. In some cases net_2≠net_1, such as when the adjacent parallel metal line is a different power polarity such as when forming a shield. The two metal portions defined by the subfields 810, 830 operate as a single composite segment between the IO pad 230 and the IO cell 220. FIG. 8B illustrates a composite segment that includes two metal portions and a gap therebetween that results from the composition illustrated in FIG. 8A.

Returning to FIG. 7 the centerline points field 740 may include one or more coordinates, e.g. x-y coordinate pairs, that specify the centerline of the wire path 240. In some cases a wire path only include a single straight segment between the pad 230 and the IO cell 220. In other cases multiple segments are specified.

Figure 9:
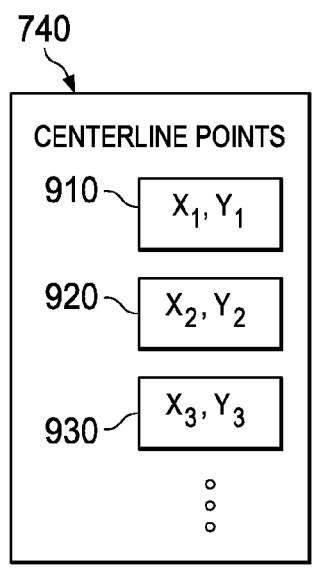

FIG. 9 illustrates an example in which the centerline points field 740 specifies multiple segments. Referring to FIG. 2B, the wire path 240 may be described by two segments. Coordinate pairs 910, 920 may describe a first segment from $P_1$ to $P_2$. Coordinate pairs 920, 930 may describe a second segment from $P_2$ to $P_3$. The wire path 240 may be specified by a single metalDef-type line with more than three coordinate pairs, or may be specified by two metalDef-type lines, e.g. one for each segment. The principles described with respect to the wire path 240 may be extended to wire paths with more than two segments.

As mentioned previously Table 2 includes a keyword routeLike. The routeLike keyword implements a mechanism referred to herein as "inheritance". The routeLike keyword is followed by two template names, WXE and WXF. The routeLike keyword directs the parametric routing module 520 to create a new segment having the first following template name, e.g. WXE, thus overwriting any previous template definition named WXE. The new segment inherits the characteristics of the segment having the second following template name, e.g. WXF, up to the point of the routeLike keyword. Thus, WXE is defined including all the segments of the two metalDef lines preceding the routeLike line. After the template name WXE is defined, it may be used independently of the WXF template name. Additional segments may be added to the WXF template name via a third metalDef line without affecting the WXE template name.

A keyword inHerit may support "multiple inheritance". In this case, characteristics of a template definition may be added to a previously defined template definition without overwriting the previously defined definition. Continuing the previous example, after defining characteristics of the template definition WXE, characteristics of another template definition WXG may be added to WXE by a definition line "inHerit WXE WXG".

FIGS. 10-12 illustrate specific examples of aspects of methods of the disclosure. FIG. 10A illustrates an IC 1010. The IC 1010 includes four instances of an IO region 1020, e.g. 10 regions 1020t, 1020b, 1020l, 1020r. Each IO region 1020 includes a single IO pad and a single IO cell.

A single instance of the IO region 1020 is illustrated in FIG. 10B. The parametric routing module 520 may rotate the frame of reference of the IO regions 1020b, 1020l and 1020r so that paths definitions may be specified in terms of a common frame of reference, e.g. that of the IO region 1020a. The IO region 1020 includes an IO path 1030 including three segments. A first segment is between points $P_1$ and $P_2$, a second segment is between points $P_2$ and $P_3$, and a third segment is between points $P_3$ and $P_4$. The point $P_1$ may be selected as the IO region 1020 origin for convenience.

FIG. 11A illustrates a single instance of the IO region 1020 in greater detail. An IO pad 1110 and an IO cell 1120 each have a geometric center that is respectively located at $P_1$ and $P_4$. $P_1$ and $P_4$ may be determined from the locations of the cells that define the IO pad 1110 and the IO cell 1120. $P_1$ and $P_4$ are fixed in various embodiments, meaning that the parametric routing module 520 does not modify these locations. $P_1$ and $P_4$ are vertically separated by a distance $D_1$, and are horizontally separated by a distance $D_2$. Thus, both $D_1$ and $D_2$ may be computed from $P_1$ and $P_4$. Points $P_1$ and $P_2$ are vertically separated by a distance $D_3$, and points $P_3$ and $P_4$ are vertically separated by a distance $D_4$. The points $P_2$ and $P_3$ are dynamic, meaning the parametric routing module 520 may changes their locations in various circumstances. A width W may be specified by a width parameter, or may determined indirectly from a resistance parameter. $D_1$ and $D_2$ may be determined from $P_1$ and $P_2$.

As a nonlimiting example, $D_1$ may be about 100 μm. In the absence of any obstructions, a $D_3$ may be about equal to $D_4$. In some cases $D_3$ may computed dynamically to be $0.5 \ast D_1$, so that $D_3$ is automatically updated when $P_1$ and/or $P_4$ changes. In other cases the distance $D_3$ and/or the distance $D_4$ may be specified by a global variable, e.g. by the property list 540. Thus, the configuration of FIG. 11A may be a default configuration of the path 1030 when the IO pad 1110 and the IO cell 1120 are arranged as illustrated.

In some cases, it may be desirable to customize the IO path 1030 in some specific instances of the IO region 1020. An entry may be placed in the property list 540 to specify a local value of a variable, e.g. offset1, that determines $D_3$. The local value may be associated with the signal name of the IO path 1030 for the customized instance of the IO region 1020. Thus, when the parametric routing module 520 determines the geometry of the path 1030 for the customized instance, it may render a configuration of the IO path 1030 as illustrated in FIG. 11B, in which $D_3$ and $D_4$ have a customized value. In various embodiments $D_4$ is determined as a function of $D_3$ so only one parameter need be specified to result in the desired configuration. Thus, e.g. $D_4 = D_1 - \text{offset1}$.

FIG. 12 illustrates aspects of operation of the parametric routing tool 500 when an IO region 1210 includes a reference object, e.g. an IO pad 1220, that obstructs some possible configurations of the IO path 1030. A local origin of the IO region 1210 is placed at the geometrical center of the IO cell 1120, e.g. at $P_4$. The IO pad 1220 has a radius $R_1$ and a center point $P_5$ at local coordinates (ru,rv). The configuration of FIG. 12 may occur commonly in various high-density IO pad configurations, such as bump-pad arrays. However, the coordinates (ru,rv) may be different in various cases.

In the illustrated case, the relevant concern from a design perspective may be the distance between metal features of the manufactured IC. Thus an offset $gap_1$ may represent a minimum desired distance between the IO pad 1220 and the IO path 1030 segment between the points $P_2$ and $P_3$. The value of $gap_1$ may be expressed as a global or local variable value. The positions of centerline points $P_2$ and $P_3$ may be expressed in a metalDef line of the path description file 550 in terms of rv, $R_1$, $gap_1$, and a width $W_1$ of the IO path 1030. The parametric routing module 520 may then compute the positions of the geometric elements of the IO path 1030 to maintain the desired distance between the IO pad 1220 and the $P_2$-$P_3$ segment. Those skilled in the pertinent art will appreciate that the principles illustrated by this example may be applied to various configurations of the IO path 1030 and other types of obstructions.

Optionally the calling program may be configured to maintain a list of parametric routes whose positions are dependent on the location of a reference object such as the IO pad 1220. When the location of the reference object changes, such as by manual repositioning by an operator, the calling program may update all the parametric routes associated with that reference object such that relevant design constraints are maintained.

In some embodiments the parametric routing tool 500 is configured to present a graphical representation of the computed wire path 240 to a user. If not satisfied with the resulting path, the user may dynamically change the value of one or more parameter values to produce a desired routing. The parameter entry may be by graphic user interface (GUI) using well-known techniques.

FIGS. 13A and 13B illustrate a method 1300 as a block diagram of the operation of the parametric routing module 520 according to one embodiment. The method 1300 presents a number of steps that may be executed by an apparatus such as the parametric routing tool 500. Appendix A includes one specific embodiment of instructions that implement the method 1300. The steps of the method 1300 may be performed in another order than the illustrated order. In some embodiments some of the steps are not performed.

In a step 1305 the method 1300 is invoked, e.g. by an API call from the functional design module 510 to the parametric routing module 520. The parametric routing module 520 may receive via the API call coordinates of various features of an IO region, e.g. the center point $P_1$ of the IO cell 220, the center point $P_2$ of the IO pad 230 and the center point $P_4$ of the reference object 250, and a pointer to a global array of route description variable names.

In a step 1310 the parametric routing module 520 maps the received coordinates to a local coordinate system of an invariant frame of reference of the IO region. The mapping may, e.g. adjust the coordinates of the various features taking into account rotation of the IO region from a side location of the IC 110. The mapping may also include a step 1315 in which the coordinates of the IO region features are translated such that the center of the IO cell 220 is the origin of the IO region. In other words, the locations of the features other than the IO cell 220 are determined relative to the center of the IO cell 220.

In a step 1320 the parametric routing module 520 determines the horizontal (x) and vertical (y) directions of the pad 230 relative to the IO cell 220. For example, if the IO pad 230 is below and to the left of the IO cell 220 within the local coordinate system of the IO region, then the relative direction of the IO pad 230 to the IO cell 220 may be expressed as (−1,−1). This determination may be used for computational convenience in some of the steps that follow.

In a decisional step 1325 the parametric routing module 520 tests to see if each of the IO pads 230 of the IC 110 has been mapped to an IO cell 220. If not then the method 1300 returns to the step 1305. When all the IO pads 230 have been mapped, the method 1300 advances to a step 1330.

In the step 1330 the parametric routing module 520 reads the path description file 550. Each line of the path description file may be stored, e.g. in an array, for later parsing. The path description file 550 includes one or more path descriptions, and may include one or variable names that define values used by the path descriptions.

In a step 1335 the parametric routing module 520 unpacks the route description variable names within the global array of variable names. For example, the route description variable names may be read into a local array that may be indexed using a local indexing variable.

In a step 1340 the parametric routing module 520 overrides any route descriptions variable names contained by the global array that are associated with a path description in the path description file.

In a step 1342 the parametric routing module 520 begins parsing a path definition line of the path description file. The first field of the path definition line may include one of several keywords, e.g. metalDef, that signals a program instruction implementing the method 1300 that the path definition line has been encountered.

Referring to FIG. 13B, in steps 1345, 1350, 1355, 1360 the parametric routing module 520 parses the first path description. In the step 1345 the path variable name is recovered. In the step 1350 the description of the width of the wire path 240 is recovered and the width is calculated. In the step 1355 the centerline points are decoded and stored. In the step 1360 the first segment of the wire path 240 is determined.

In a decisional step 1365 the parametric routing module 520 determines if an additional centerline point is provided by the path description. If additional points are specified, the method 1300 advances to a step 1370 in which the additional point is concatenated to the wire path 240. Control returns to the step 1365, where the parametric routing module 520 again determines if an additional centerline point remains to be added.

When no additional centerline points remain, the parametric routing module 520 advances to a step 1375. In the step 1375 wire path 240 length is compared to a maximum allowed length. If the wire path 240 length exceeds the maximum allowed length the method 1300 advances to an error state 1377 and the parametric routing tool 500 may notify the user of the error condition for correction.

If the length of the wire path 240 does not exceed the allowed maximum, the parametric routing module 520 executes a step 1380 in which it determines whether the wire path 240 includes a repeating pattern across its width. A repeating pattern may include, e.g. a combination of metal segments and spaces (slots) such as to reduce dishing from CMP.

In a step 1385 the parametric routing module 520 determines the total width of the wire path 240, including any spaces. In a step 1390 all the geometrical components of the wire path 240 are determined, including all aspects of length, width and any spaces.

In a decisional step 1392 the parametric routing module 520 determines if additional path definitions remain to be processed. If so the parametric routing module 520 reads the next path definition and the method 1300 returns to the step 1345. If no additional path definitions remain, then the method returns control to the functional routing module 510 via a step 1399 to the calling EDA instructions.

Those skilled in the art to which this application relates will appreciate that other and further additions, deletions, substitutions and modifications may be made to the described embodiments.

What is claimed is:

1. A method of determining signal routing in an integrated circuit, comprising:
   providing first coordinates of an input/output cell to a parametric routing module configured to be executed by a computer;
   providing second coordinates of an input/output pad to said parametric routing module;
   providing at least one wire path parameter to said parametric routing module, wherein said at least on wire path parameter includes at least a desired resistance; and
   executing on said computer said parametric routing module to determine a physical dimension of a wire path between said input/output cell and said input/output pad based on said at least one parameter.

2. The method as recited in claim 1, wherein an electronic design automation tool executed by said computer provides said at least one parameter to said parametric routing module.

3. The method as recited in claim 1, wherein said parametric routing module is implemented as an application programming interface of an electronic design automation tool executed by said computer.

4. The method as recited in claim 1, wherein said parametric routing module is configured to read a path description file that defines said physical dimension based on said at least one parameter.

5. The method as recited in claim 4, wherein said parametric routing module is configured to assign to a first path template name an input/output path definition that is based on said at least one parameter and to copy said input/output definition to a second path template name.

6. The method as recited in claim 1, wherein said first and second coordinates are associated with a local frame of reference, and said parametric routing module is configured to rotate said local frame of reference.

7. The method as recited in claim 1, wherein said at least one parameter defines a width of said wire path.

8. The routing system of claim 7, wherein said at least one parameter is a first parameter, and a second parameter defines a gap between two metal portions of said wire path.

9. An integrated circuit input/output signal routing system, comprising:
   a computer; and
   a parametric routing module configured to receive from an electronic design automation tool operating on said computer first coordinates of an input/output cell, second coordinates of an input/output pad, and at least one wire path parameter,
   wherein said at least one wire path parameter includes at least a desired resistance and said parametric routing module is further configured to use said at least one parameter to determine a physical dimension of a wire path between said input/output cell and said input/output pad.

10. The routing system as recited in claim 9, wherein said electronic design automation tool provides said at least one wire path parameter to said parametric routing module.

11. The routing system as recited in claim 9, wherein said parametric routing module is implemented as an application programming interface of said electronic design automation tool.

12. The routing system as recited in claim 9, wherein said parametric routing module is configured to read a path description file that defines said physical dimension based on said at least one parameter.

13. The routing system as recited in claim 12, wherein said parametric routing module is configured to assign to a first path template name an input/output path definition that is based on said at least one parameter and to copy said input/output definition to a second path template name.

14. The routing system as recited in claim 9, wherein said first and second coordinates are associated with a local frame of reference, and said parametric routing module is configured to rotate said local frame of reference.

15. The routing system as recited in claim 9, wherein said at least one parameter defines a width of said wire path.

16. The routing system of claim 15, wherein said at least one parameter is a first parameter, and a second parameter defines a gap between two metal portions of said wire path.

17. The routing system of claim 9, wherein said design database input module and said parameter assignment module are embodied in program code stored on a non-transitory computer-readable medium.

18. A computer program product, comprising a non-transitory computer readable medium having a series of operating instructions embodied therein, said series of operating instructions adapted to be executed to implement a method of determining signal routing in an integrated circuit, the method comprising:
    providing first coordinates of an input/output cell to a parametric routing module;
    providing second coordinates of an input/output pad to said parametric routing module;
    providing at least one wire path parameter to said parametric routing module, wherein said at least one wire path parameter includes at least a desired resistance; and
    employing said parametric routing module to use said at least one parameter to determine a physical dimension of a connection between said input/output cell and said input/output pad.

19. The computer program product as recited in claim 18, wherein an electronic design automation tool provides said at least one parameter to said parametric routing module.

20. The computer program product as recited in claim 18, wherein said parametric routing module is implemented as application programming interface of an electronic design automation tool.

21. The computer program product as recited in claim 18, wherein said parametric routing module is configured to read a path description file that defines said physical dimension based on said at least one parameter.

22. The computer program product as recited in claim 21, wherein said parametric routing module is configured to assign to a first path template name an input/output path definition that is based on said at least one parameter and to copy said input/output definition to a second path template name.

23. The computer program product as recited in claim 18, wherein said first and second coordinates are associated with a local frame of reference, and said parametric routing module is configured to rotate said local frame of reference.

24. The computer program product as recited in claim 18, wherein said at least one parameter defines a width of said wire path.

25. The computer program product of claim 24, wherein said at least one parameter is a first parameter, and a second parameter defines a gap between two metal portions of said wire path.

26. A computer program product, comprising a non-transitory computer readable medium having a series of operating instructions embodied therein, said series of operating instructions adapted to be executed to implement a method of determining signal routing in an integrated circuit, the method comprising:
    receiving first coordinates of an input/output cell into a parametric routing module;
    receiving second coordinates of an input/output pad into said parametric routing module;
    receiving at least one wire path parameter to said parametric routing module, wherein said at least one wire path parameter includes at least a desired resistance; and
    employing said at least one parameter to determine a physical dimension of a connection between said input/output cell and said input/output pad.

\* \* \* \* \*